United States Patent
Oshima et al.

(10) Patent No.: US 6,772,481 B2
(45) Date of Patent: Aug. 10, 2004

(54) HINGE ASSEMBLY

(75) Inventors: Kazuyoshi Oshima, Naruto-machi (JP); Shinichiro Koshikawa, Yokaichiba (JP); Katsuya Imai, Tako-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 3 days.

(21) Appl. No.: 10/181,916

(22) PCT Filed: Sep. 21, 2001

(86) PCT No.: PCT/JP01/08273

§ 371 (c)(1),
(2), (4) Date: Jul. 24, 2002

(87) PCT Pub. No.: WO02/29266

PCT Pub. Date: Apr. 11, 2002

(65) Prior Publication Data

US 2003/0009851 A1 Jan. 16, 2003

(30) Foreign Application Priority Data

Sep. 29, 2000 (JP) ..................... 2000-299502

(51) Int. Cl.$^7$ .............................. E05D 11/10
(52) U.S. Cl. ............... 16/330; 16/297; 16/319; 16/321
(58) Field of Search .......... 16/277, 297, 303, 16/319, 321, 330

(56) References Cited

U.S. PATENT DOCUMENTS

| 5,109,571 | A | * | 5/1992 | Ohshima et al. | 16/307 |
| 5,600,868 | A | * | 2/1997 | Tourville et al. | 16/277 |
| 5,628,089 | A | * | 5/1997 | Wilcox et al. | 16/303 |
| 5,704,094 | A | * | 1/1998 | Hartigan et al. | 16/303 |
| 5,970,819 | A | * | 10/1999 | Katoh | 74/531 |
| 5,996,132 | A | * | 12/1999 | Sorimachi | 4/236 |
| 6,070,298 | A | * | 6/2000 | Sorimachi | 16/330 |
| 6,085,387 | A | * | 7/2000 | Han | 16/330 |
| 6,115,886 | A | * | 9/2000 | Fujita | 16/330 |
| 6,175,990 | B1 | | 1/2001 | Kato et al. | 16/334 |
| 6,305,050 | B1 | * | 10/2001 | Imai | 16/303 |

FOREIGN PATENT DOCUMENTS

| JP | 59-065612 A | 4/1984 |
| JP | 07-011831 A | 1/1995 |
| JP | 09-233165 A | 9/1997 |
| JP | 10-317779 A | 12/1998 |
| JP | 11-50727 A | 2/1999 |
| JP | 11-112630 A | 4/1999 |

* cited by examiner

Primary Examiner—Heather Shackelford
Assistant Examiner—Michael J. Kyle
(74) Attorney, Agent, or Firm—Brown & Michaels PC; Eugene Stephens & Associates

(57) ABSTRACT

A hinge assembly (1) used for a foldable cellular telephone, comprising a pair of abutment members (5, 6), a bias means (7) biasing the abutment members so that the abutment members are pressingly brought into contact with each other, a projection (54) extending in the radial direction of one abutment member (5), and a recess (64) allowing the access of the projection thereto formed in the other abutment member (6), wherein the recess (64) is formed of an inside recess and an outside recess on the radial inner and outer sides of the other abutment member, and the inside recess is formed along the center line of the other abutment member and the outside recess is formed so that the width thereof is increased from the inside recess to the outside so that the side surface of the recess is generally formed in a dogleg-like configuration.

16 Claims, 14 Drawing Sheets

HINGE ASSEMBLY

TECHNICAL FIELD

This invention relates to a hinge assembly which is suited to be used for a foldable cellular telephone or the like.

BACKGROUND ART

In general, a foldable cellular telephone includes, as shown in FIGS. 18 and 19, a transmission section A and a reception section B. The transmission section A and the reception section B are turnably connected through a hinge assembly (not shown) for turning between a non-talk position where the transmission section A and the reception section B are abutted with each other as indicated by a solid line of FIG. 18 and a talk position as indicated by a solid line of FIG. 19. Moreover, when the angle formed between the transmission section A and the reception section B is smaller than α, the transmission section A and the reception section B are turned into a non-talk position by bias means built in the hinge assembly and held in that position. When the angle formed between the transmission section A and the reception section B is brought to be larger than a predetermined angle β, the transmission section A and the reception section B are turned into the talk position by bias means and held in that position.

As shown in FIG. 20, the hinge assembly includes a pair of abutment plates (abutment members) C,D arranged in mutually opposing relation and bias means (not shown) for biasing the paired abutment plates C,D towards each other. The pair abutment plates C,D are non-turnably connected to the transmission section A and the reception section B, respectively. Therefore, the abutment plates C,D are relatively turned as the transmission section A and the reception section B are turned.

The abutment plate C has a pair of projections C1, C1 which are formed on its opposing surface with respect to the abutment plate D and which are arranged 180 degrees away from each other in the circumferential direction. The remaining abutment plate D also has a pair of recesses D1, D1, which are formed on its opposing surface with respect to the abutment plate C and which are arranged 180 degrees away from each other in the circumferential direction. The projection C1 and the recess D1 retain the transmission section A and the reception section B in a non-talk position or in a talk position with the help of the biasing force of the bias means.

Specifically, as shown in FIG. 21, the projection C1 and the recess D1 are arcuate in section. When the transmission section A and the reception section B are in the non-talk position, the projection C1 and the recess D1 are, as shown in FIG. 21(A), abutted with each other at areas which are slightly circumferentially away from their centers. Owing to this arrangement, the biasing force of the bias means is converted into a rotational biasing force (rotation biasing force for turning the abutment plate D in a direction opposite to the arrowed direction) for turning the abutment plate C in the arrowed direction. By this rotational biasing force, the transmission section A and the reception section B are held in the non-talk position. As shown in FIG. 21(B), when the angle formed between the transmission section A and the reception section B is α or less, an area which is slightly away from the central part of the projection C1 contact one end portion of the recess D1. By this, the abutment plate C is biased in the arrowed direction of FIG. 21(B) and the transmission section A an the reception section B are turned in the non-talk position. When the angle formed between the transmission section A and the reception section B is β or more, the projection C1 and the recess D1 are brought into a symmetrical state with respect to the state shown in FIG. 21(B). Accordingly, the abutment plate C is biased in a direction opposite to the arrowed direction and the transmission section A and the reception section B are turned as far as to the talk position. When the transmission section A and the reception section B are located in the talk position, the projection C1 and the recess D1 are press-contacted at their central areas with each other as shown in FIG. 21(C). In that connection, the biasing force of the bias means merely urges the projection C1 against the bottom surface of the recess D1 and is never converted into a rotational biasing force. However, when the abutment members C,D are turned into either one direction from the position (hereinafter referred to as the "neutral position") shown in FIG. 21(C), the biasing force of the bias means is converted into a rotational biasing force and causes the abutment members C,D to return into the neutral position. Accordingly, the transmission section A and the reception section B are held in the talk position.

As shown in FIGS. 22 and 23, when viewed in the direction of the axes of the abutment plates C, D, although the projection C1 exhibits a generally rectangular configuration, the recess D1 exhibits a rectangular configuration in the example shown in FIG. 22 but the recess D1 exhibits a sector-like configuration in the example shown in FIG. 23. When the abutment plates C, D are located in the neutral position, the projection C1 and the recess D1 are line contacted with each other at their central areas in any one of the above-mentioned two configurations of the recess D1. However, when the abutment plates C, D are relatively turned away from the neutral position in a range of an angle α, the projection C1 contacts the recess D1 only at its outer periphery side in case the recess D1 is in rectangular configuration and it contacts the recess D1 only at its inner periphery side in case the recess D1 is in sector-like configuration. Accordingly, the conventional hinge assembly, there is such a problem that the projection C1 is worn off soon.

DISCLOSURE OF THE INVENTION

In order to solve the above problem, the features of the present invention reside in a hinge assembly comprising a pair of abutment members arranged in mutually opposing relation and capable of making relative rotation, and bias means for biasing the pair of abutment members, so as to be press contacted with each other, one of the pair of abutment members having a projection formed on an opposing surface thereof and extending radially of the abutment member, the other abutment member having a recess formed on an opposing surface thereof and allowing the projection to be brought therein and thereout in accordance with the relative rotation of the their abutment members, the hinge assembly being characterized in that the recess comprises an inner recess at an inner side and an outer recess at an outer side in a radial direction of the abutment member, and one side surface of the inner recess is parallel to a radial line of the abutment member and one side surface of the outer recess is slanted with respect to one side surface of the inner recess such that an inner end portion thereof is crossed with an outer end portion of one side surface of the inner recess and an outer end portion thereof is away from the inner recess in a circumferential direction towards outside in the radial direction of the abutment member, so that one side surfaces of the inner and our recesses which contact one end portion of the projection, when viewed in a direction of axes of the abutment members, exhibit a dogleg like configuration as a whole.

It is preferred that one side surface of the outer recess is arranged such that one end portion of the one side surface of the outer recess in the circumferential direction of the abutment member contacts an opposing surface of the abutment member.

It is also preferred that one side surfaces of the inner recess and the outer recess are defined by an outwardly projecting arcuate surface.

It is also preferred that the inner recess and the outer recess, when viewed in an axial line of the fixed disc, are in symmetric relation with respect to a center line passing through width-wise centers of the inner recess and the outer recess and orthogonal to the axis of the abutment member.

It is also preferred that when the pair of abutment members are turned into a predetermined neutral position, the projection comes into contact with opposite side portions of the inner recess.

BRIEF DESCRIPTION OF DRAWINGS

FIG. 7(A) is a front view, FIG. 7(B) is a right side view, FIG. 7(C) is a plan view, FIG. 7(D) is a lower surface view, and FIG. 7(E) is a front sectional view thereof.

FIG. 8(A) is a front view, FIG. 8(B) is a right side view, FIG. 8(C) is a plan view, FIG. 8(D) is a lower surface view, and FIG. 8(E) is a side sectional view thereof.

FIG. 9(A) is a front view, FIG. 9(B) is a right side view, FIG. 9(C) is a plan view, FIG. 9(D) is a lower surface view, and FIG. 9(E) is a front sectional view thereof.

FIG. 10(A) is a front view, FIG. 10(B) is a right side view, FIG. 10(C) is a front sectional view, FIG. 10(D) is a lower surface view thereof.

FIG. 21(A) shows a state in which the transmission section and the reception section are turned in the non-talk position, FIG. 21(B) shows a state in which the transmission section and the reception section are turned by an angle α from the non-talk position, and FIG. 21(C) shows a state in which the transmission section and the reception section are turned into the talk position.

BEST MODE FOR CARRYING OUT THE INVENTION

Figure 1:
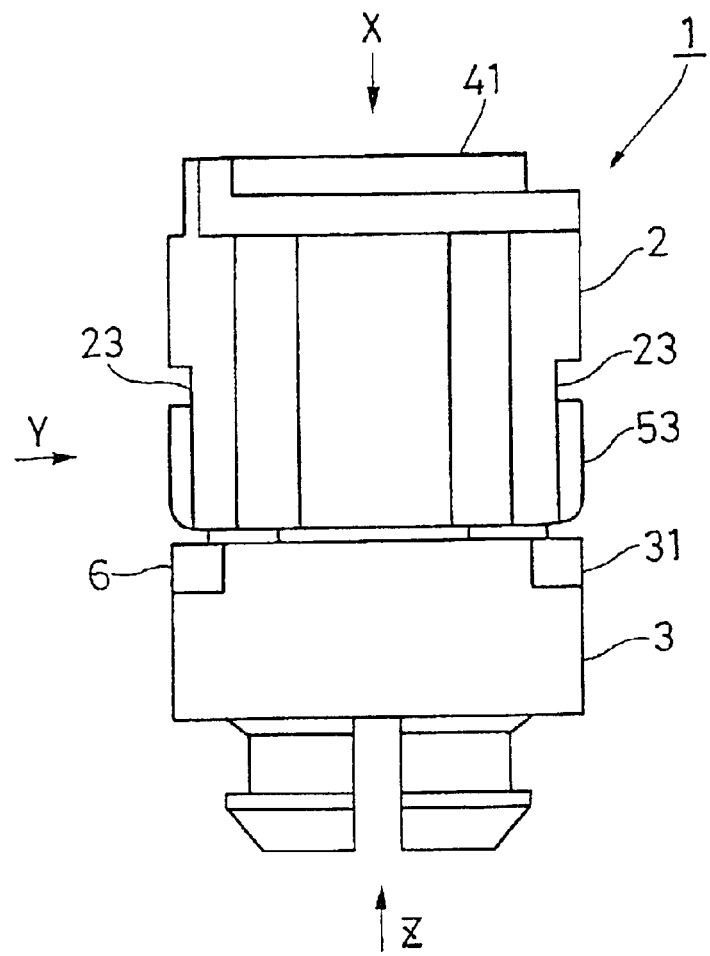
FIG. 1 is a front view showing one mode for carrying out the present invention.
Figure 2:
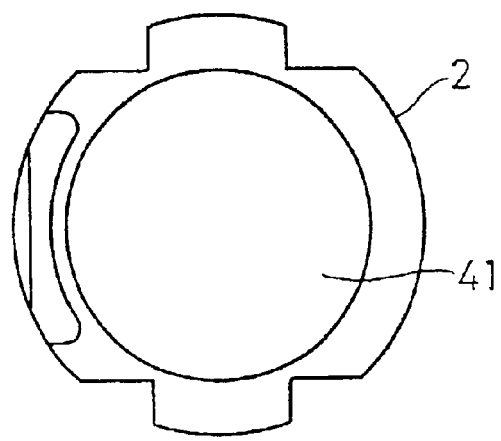
FIG. 2 is an illustration as viewed in a direction as indicated by an arrow X of FIG. 1.
Figure 3:
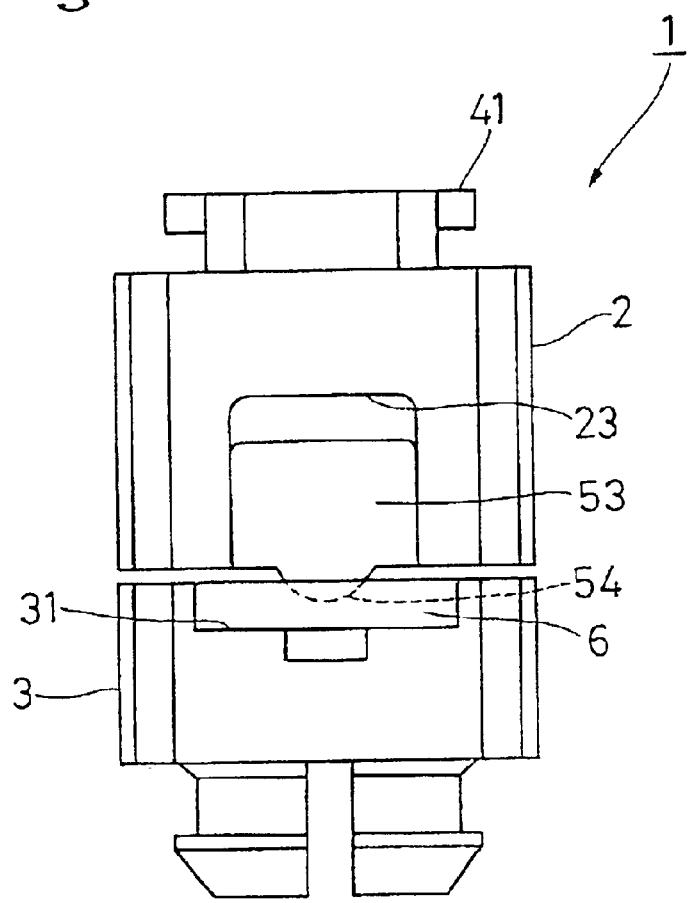
FIG. 3 is an illustration as viewed in a direction as indicated by an arrow Y of FIG. 1.
Figure 4:
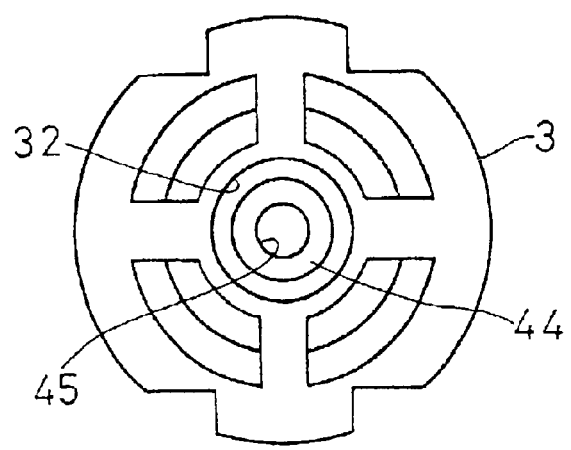
FIG. 4 is an illustration as viewed in a direction as indicated by an arrow Z of FIG. 1.

One mode for carrying out the invention, in which the invention is incorporated with a hinge assembly used for a foldable cellular telephone, will be described herein after with reference to FIGS. 1 through 16. It should be noted, however, the present invention can be applied to other hinge assemblies than a hinge assembly used for a foldable cellular telephone, inasmuch as those hinge assemblies are used for turnably connecting two turning members.

As shown in FIGS. 1 through 6, a hinge assembly 1 includes first and second fixed members 2,3, a hinge pine 4, a movable disc (abutment member) 5, a fixed disc (abutment member) 6 and a coiled spring (bias means) 7. Those components 2 through 7 are arranged with their axes aligned.

As shown in FIGS. 1 through 6 and FIG. 7, the first fixed member 2 has a bottom portion 21 at one end portion thereof and is open at the other end portion, thus exhibiting a cylindrical configuration with a bottom. The first fixed member 2 is non-turnably connected to one of the transmission section A and the reception section B with its axis aligned with the rotation axes of the transmission section A and the reception section B. A through hole 22 is formed in a central area of the bottom portion 21. A pair of guide grooves 23, 23 axially extending from the open end face is formed in the open end portion side of a peripheral wall portion of the first fixed member 2, The pair of guide grooves 23, 23 are 180 degrees away from each other in the circumferential direction.

The second fixed member 3 is non-turnably connected to the other of the transmission section A and the reception section B in such a manner as to be in opposing relation to the first fixed member. As shown in FIGS. 1 through 6 and FIG. 8, a receiving recess 31 is formed in an opposing surface of the second fixed member 3 with respect to the first fixed member 2. A through hole 32 is formed in a central area of the first fixed member 2.

Figure 6:
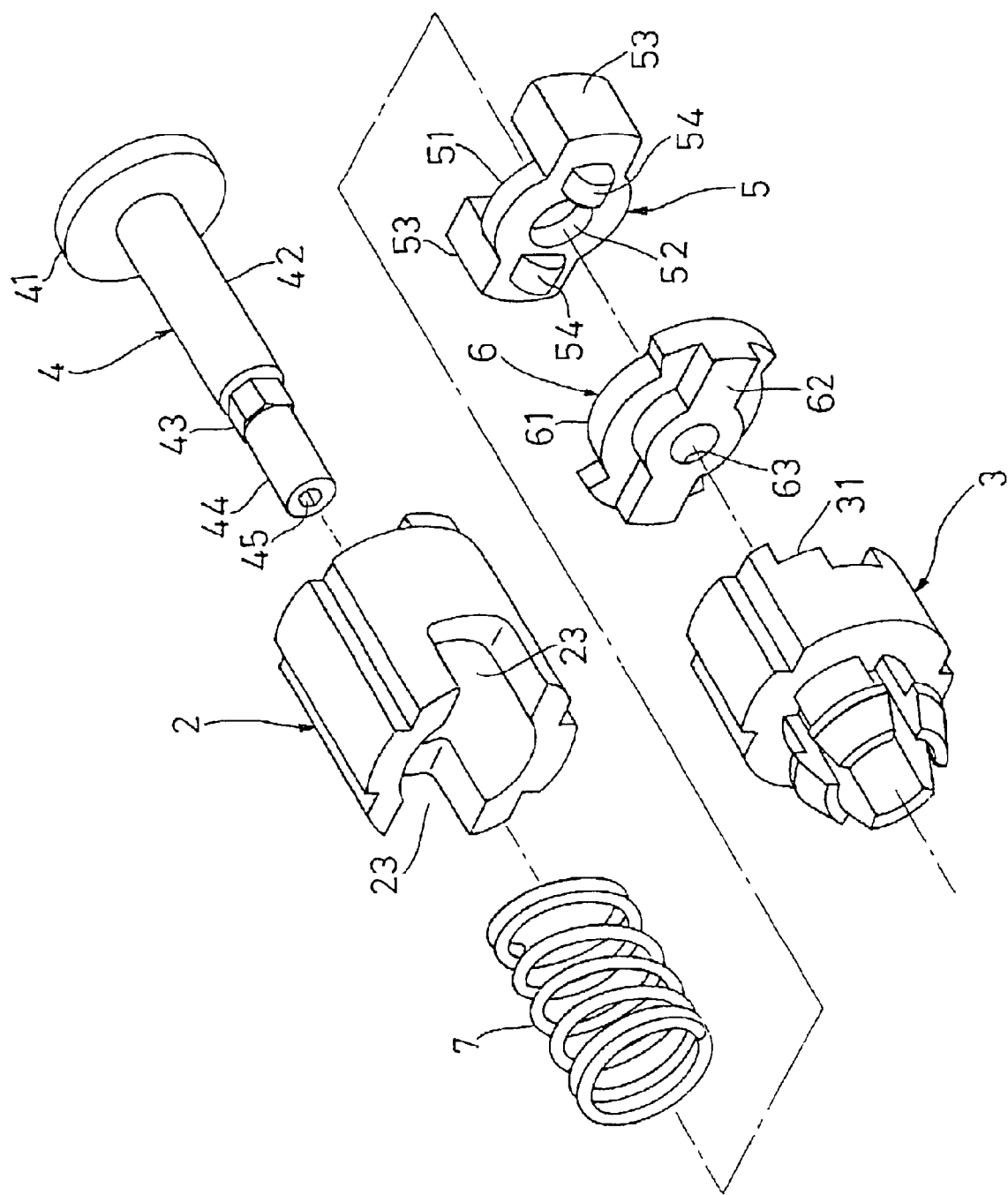
FIG. 6 is an exploded perspective view of the above mode.
Figure 7:
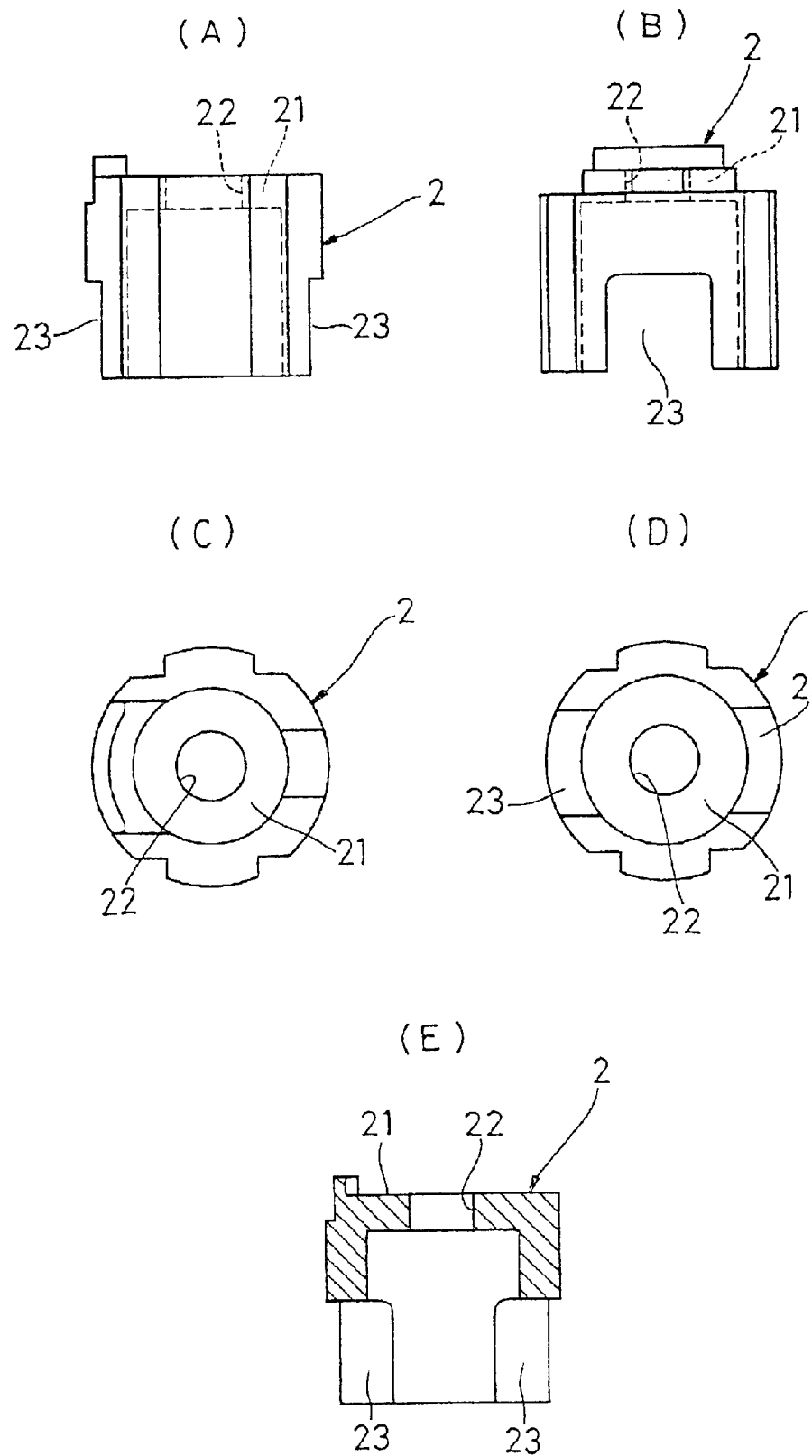
FIG. 7 is an illustration showing a first fixing member used in the above mode.
Figure 8:
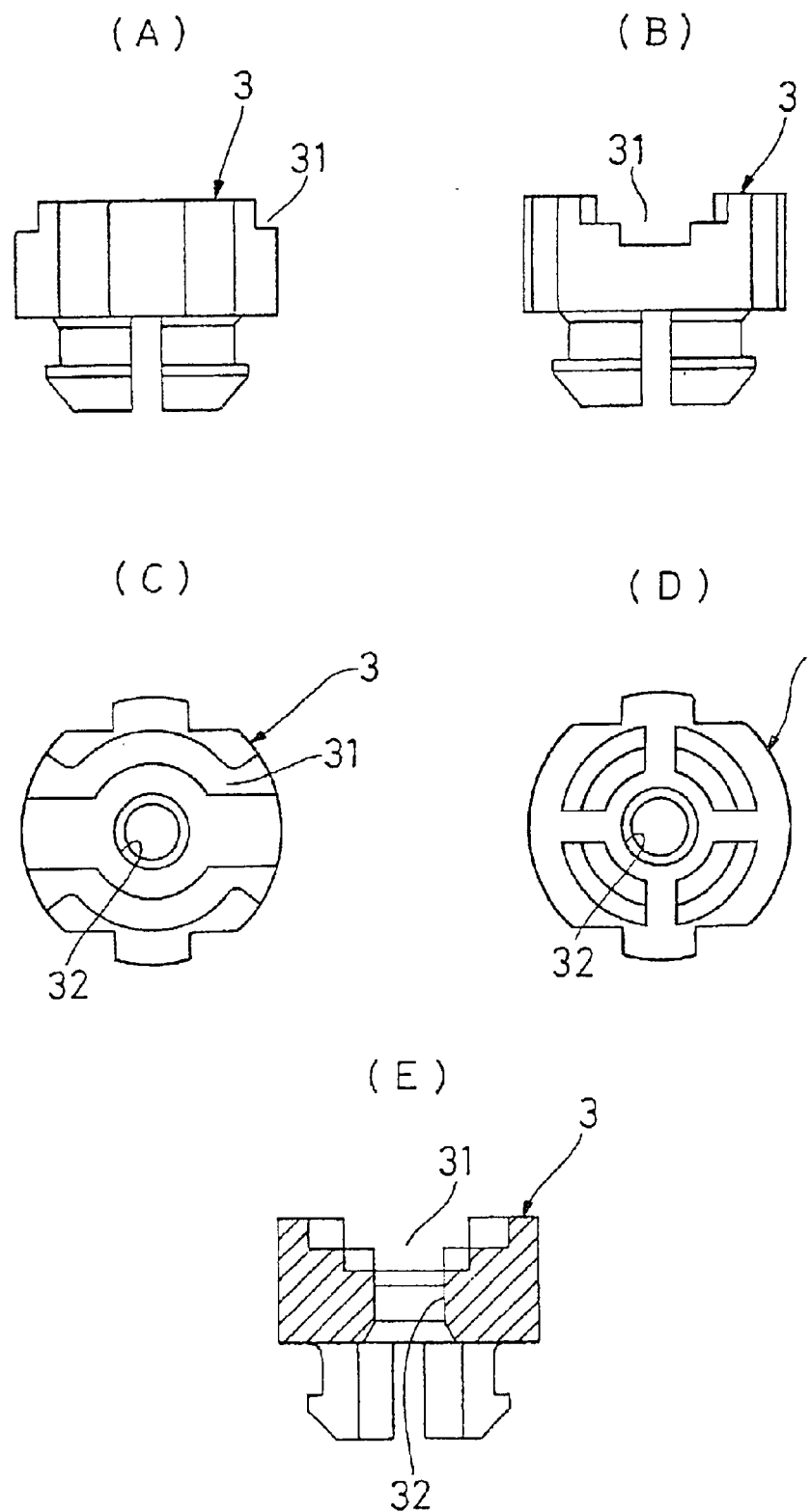
FIG. 8 is an illustration showing a second fixing member used in the above mode.

As shown in FIG. 6, the hinge pin 4 includes a head portion 41, an enlarged diameter portion 42, a sectionally hexagonal fixed portion 43, and a reduced diameter portion 44, which are all arranged in order from one end portion thereof towards the other end portion. Those components 41 through 44 are formed such that their axes are aligned with one another. The enlarged diameter portion 42 is inserted into the through hole 22 until the head portion 41 hits the bottom portion 21 of the first fixed member 2. The enlarged diameter portion 42 is turnably fitted to the through hole 22. The reduced diameter portion 44 is inserted into the through hole 32 of the second fixed member 3. After insertion, the second fixed member 3 is positionally fixed to the reduced diameter portion 44 by caulking the reduced diameter portion 44 utilizing a caulking hole 45 formed in a distal end face of the reduced diameter portion 45 so that the reduced diameter portion 44 is enlarged in diameter. The outside diameter of the reduced diameter portion 44 has a generally same diameter as a circle inscribing the hexagon which constitutes the fixed portion 43.

As shown in FIGS. 1 through 6 and FIG. 9, the movable disc 5 includes a disc-like substrate portion 51. This substrate portion 51 is axially movably inserted into the end portion on the open end portion side of the first fixed member 2. A through hole 52, into which the enlarged diameter portion 42 of the hinge pin 4 is relatively turnably and relatively movably inserted, is formed in a central area of the substrate portion 51. A pair of guide portions 53, 53 are formed on the one and the other side portions of the substrate portion 51. The movable disc 5 is axially movably but non-turnably connected to the first fixed member 2 by slidingly movably fitting the pair of guide portion 53, 53 to the guide grooves 23, 23 of the first fixed member 2. Between the substrate portion 51 of the movable disc 5 and the bottom portion 21 of the first fixed member 2, the coiled spring 7 is disposed in its compressed state. The movable disc 5 is biased towards the second fixed member 3 side by the coiled spring 7.

As shown in FIGS. 1 through 6 and FIG. 10, the fixed disc 6 includes a disc-like substrate portion 61 and a ridge 62 formed on a lower surface (surface on the reverse side of the movable disc 5 side) of the substrate portion 61. The fixed disc. 6 is, as a whole, formed in a generally same configuration as the receiving recess 31. The fixed disc 6 is fitted to the receiving recess 31, thereby the fixed disc 6 is non-turnably connected to the second fixed member 3. A through-hole 63 is formed in a central area of the fixed disc 6. This through hole 63 has an inside diameter generally equal to the outside diameter of the reduced diameter portion 44 of the hinge pin 4. A sectionally hexagonal fixed portion 43 is fixedly press fitted to the through hole 63. By this, the fixed disc 6 and the second fixed member 3 are connected to the hinge pin 4 such that they are rotated in unison. This hinge pin 4 is not absolutely necessarily connected to the second fixed member 3 and the fixed disc 6 such that they are rotated in unison. The hinge pin 4 may be connected to the first fixed member 2 and the movable disc 5 such that they are rotated in unison. Alternatively, the hinge pin 4 may be connected to the first and second fixed members 2,3, the movable disc 5 and the fixed disc 6 so that they can all rotate.

Figure 5:
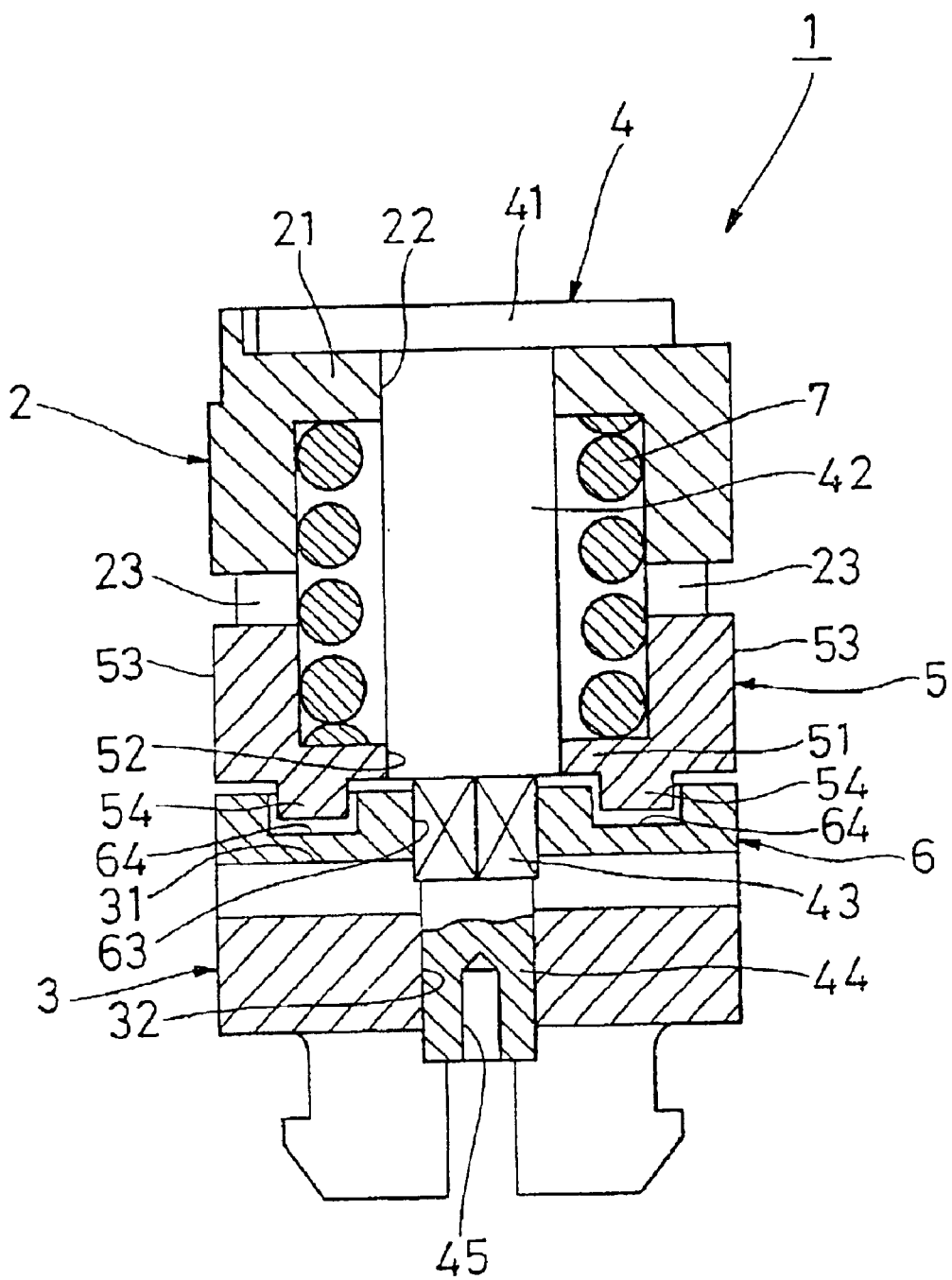
FIG. 5 is a front sectional view of the above mode.
Figure 9:
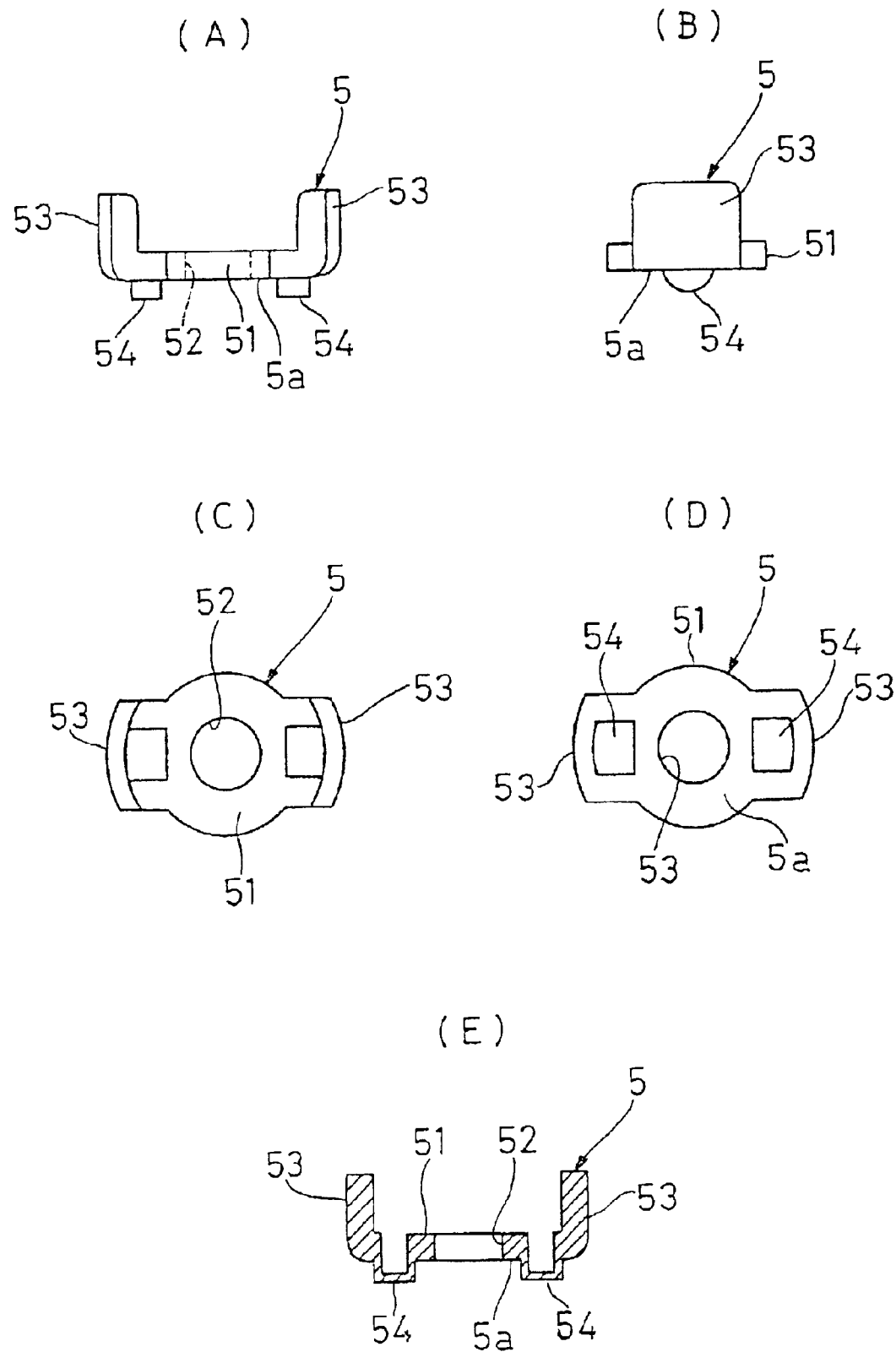
FIG. 9 is an illustration showing a movable disc used in the above mode.
Figure 10:
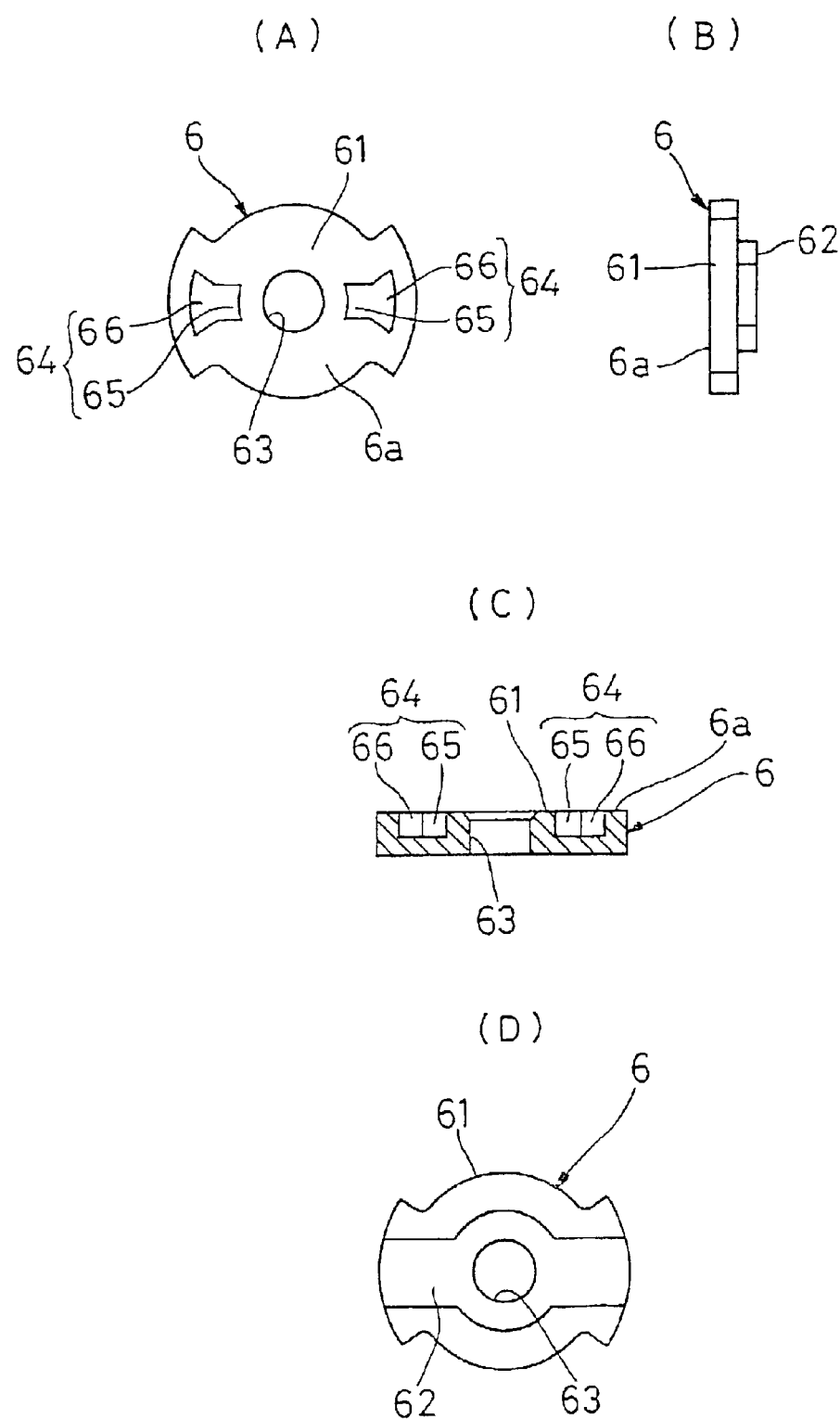
FIG. 10 is an illustration showing a fixed disc used in the above mode.

The fixed disc 6 is received by the second fixed member 3 in the direction towards the second fixed member 3 side from the first fixed member 2 side. Accordingly, the opposing surface 5a of the movable disc 5 is pressed against the opposing surface 6a of the fixed disc 6 by the coiled spring 7. As shown in FIGS. 5, 6 and 9, a pair of projections 54, 54 are formed on the opposing surface 5a of the movable disc 5 such that the projections 54, 54 are arranged 180 degrees away from each other on a circumference about the axis of the movable disc 5. On the other hand, a pair of recesses 64, 64 are formed on the opening surface 6a of the fixed dis6 such that the recesses 64, 64 are 180 degrees away from each other in the circumferential direction, as shown in FIGS. 5, 6 and 10. The recess 64 is arranged on the same circumference as the projection 54. Moreover, the length of the recess 64 in the radial direction of the discs 5, 6 is longer than that of the projection 54 in that direction.

Figure 11:
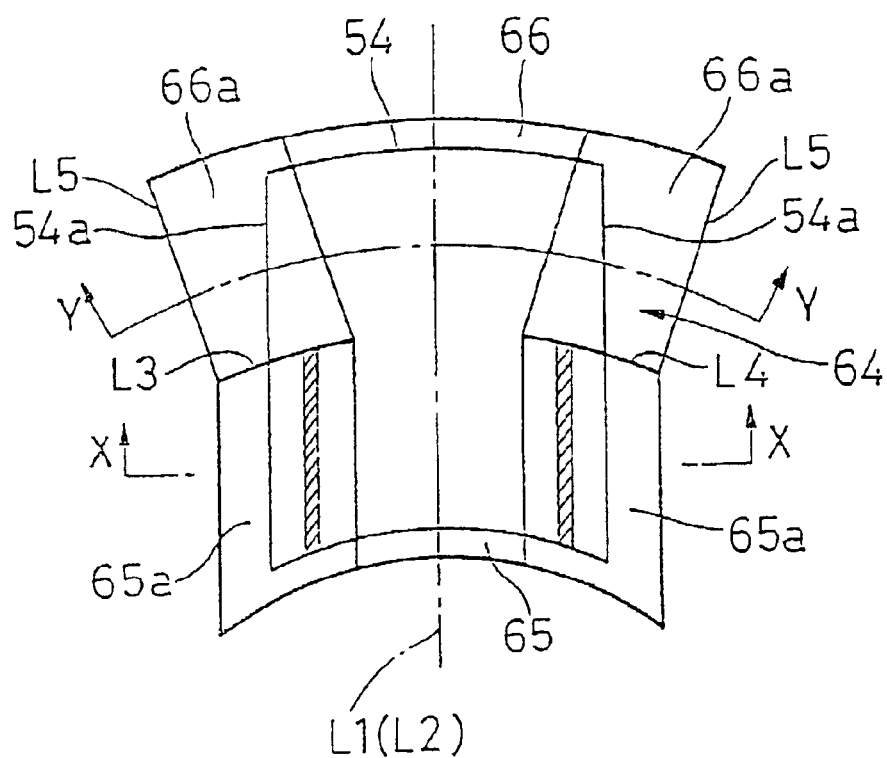
FIG. 11 is a plan view showing a relation between a recess and a projection when the movable disc and the fixed disc are returned into the neutral position.
Figure 12:
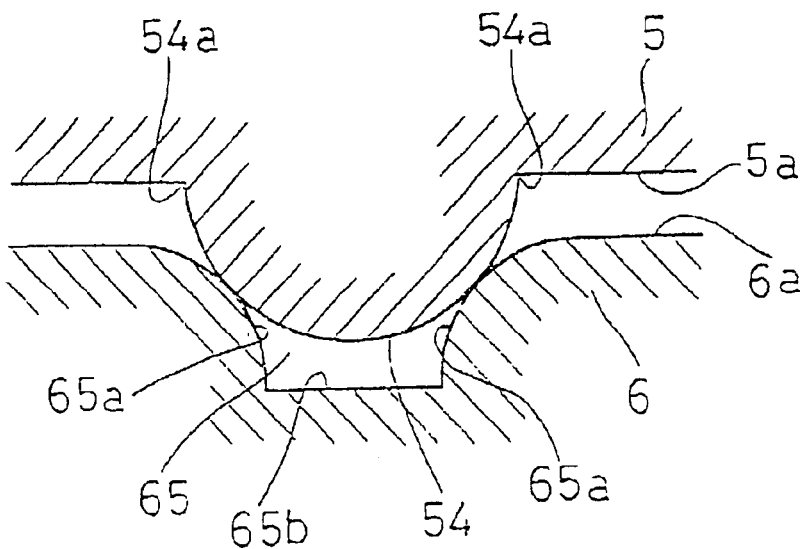
FIG. 12 is a sectional view taken on line X—X of FIG. 11.

As shown in FIGS. 11 and 12, the projection 54 is extended in the radial direction of the movable disc 5 with a predetermined width. The center line L1 in the width direction is orthogonal to the axis of the movable disc 5. The outer surface of the projection 54 is defined by an outwardly projecting arcuate surface, and the center line of this arcuate surface is, when viewed in the axial direction of the movable disc 5, aligned with the center line L1. Accordingly, the projection 54 is symmetrical with respect to the center line L1. Its sectional configuration orthogonal to the center line L1 is same, in any section. As a result, the projection 54 exhibits a square configuration, in which crossing ridge lines 54a, 54a between the projection 54 and the opposing surface 5a of the movable disc 5 is, when viewed in the axial direction of the movable disc 5, parallel to the center line L1.

The recess 64 comprises an inner recess 65 formed on the inner side in the radial direction of the fixed disc 6 and an outer recess 66 formed on the outer side in the radial direction.

The inner recess 65 is extended in the radial direction of the fixed disc 6 with a predetermined width. The center line L2 in its width direction is orthogonal to the axis of the fixed disc 6. The sectional configuration orthogonal to the center line L2 of the inner recess 65 is same in any section. Moreover, the inner recess 65 is symmetric with respect to the center line L2. Opposite side surfaces 65a, 65a (opposite side surfaces located in the circumferential direction of the fixed disc 6) of the inner recess 65 are defined by an outwardly projecting convexly curved surface. Especially, in this mode for carrying out the present invention, they are defined by an arcuate surface and the center of the arcuate surface is parallel to the center line L2. Moreover, one end portion of this arcuate surface is in contact with the opposing surface 6a.

On the other hand, the outer recess 66 is formed in a sector-like configuration which is gradually increased in width towards the outer periphery side from the inner periphery side of the fixed disc 6 when viewed in the axial direction of the fixed disc 6. The width of the inner periphery side end portion of the outer recess 66 is equal to the width of the inner recess 65. The outer recess 66 is also symmetric with respect to the center line L2. Its side surface 66a is defined by an arcuate surface having a generally same radius of curvature as the arcuate surface which defines the side surface 65a. The arcuate surface which defines the side surface 66a and the arcuate surface which defines the side surface 65a are crossed with each other without leaving any step therebetween. The crossing ridge lines are denoted by reference numeric characters L3, L4 of FIG. 11. One end portion of the arcuate surface which defines the side surface 66a is also in contact with the opposing surface 6a. The line L5 connecting contact areas between the side surface 66a and the opposing surface 6a is orthogonal to the axis of the fixed disc 6. Accordingly, the center line of the arcuate surface which defines the side surface 66a, is parallel to the line L5. As a result, the side surface 66a is slanted with respect to the side surface 65a such that the side surface 66a is away from the inner recess in the circumferential direction 65 as it goes towards the outer periphery side of the fixed disc 6. Thus, the side surfaces 65a, 66a are, as a whole, in the shape of dogleg.

With respect to the arcuate surface which defines the side surface 66a, since the center line of the arcuate surface is parallel to the line L5, it is not orthogonal to the axis of the fixed disc 6. However, an arrangement may be made such that the center line of the arcuate surface is orthogonal to the axis of the fixed disc 6. In that case, the line L5 is not orthogonal to the axis of the fixed disc.

The relation between the projection 54 and the inner and outer recesses 65, 66 will now be described. As shown in FIG. 11, when the transmission section A and the reception section B of the cellular telephone are located in the talk position, the center lines L1, L2 are aligned with each other when viewed in the direction of the axes of the discs 5, 6. The position of the movable disc 5 and the fixed disc 6 at that time is the neutral position.

Figure 13:
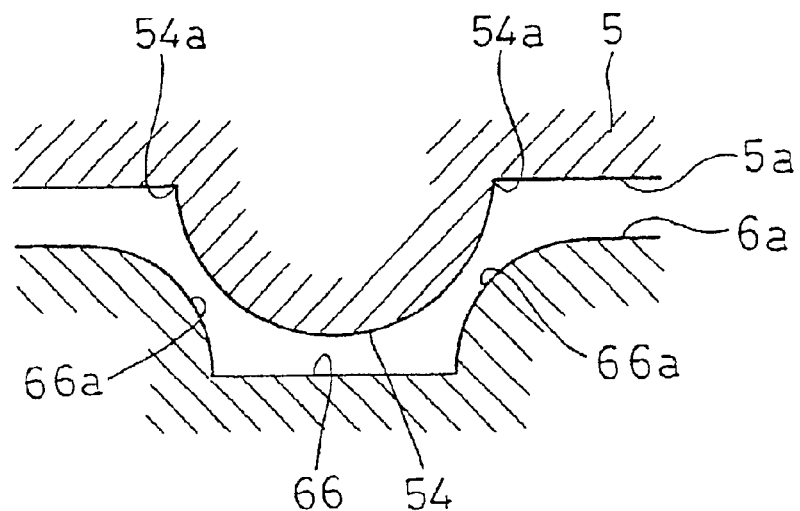
FIG. 13 is a sectional view taken on line Y—Y of FIG. 11.

In the state in which the movable disc 5 and the fixed disc 6 are located in the neutral position, the central area of the projection 54 is, as shown in FIG. 12, away from the bottom surface 65b of the inner recess 65 and only the opposite side portions of the projection 54 are in contact with the opposite side surfaces 65a, 65a of the inner recess 65. Moreover, since the center line L1 of the projection 54 and the center line of the arcuate surface which defines the side surface 65a of the inner recess 6 are parallel to each other, the projection 54 and the side surface 65a are in line contact (substantially in surface contact) as indicated by hatching of FIG. 11. On the other hand, since the outer recess 66 is increased in width as it goes outward away from the inner recess 65, the projection 54 is, as shown in FIG. 13, is away from not only the side surface 66a of the outer recess 66 but also any surface which defines the outer recess 66.

Figure 14:
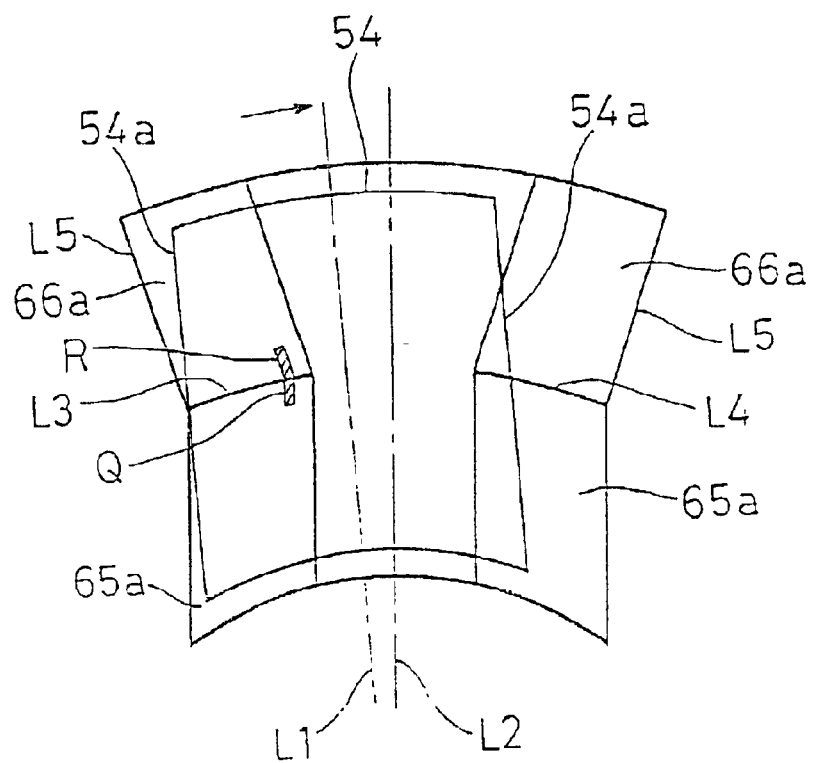
FIG. 14 is a plan view showing a relation between a recess and a projection when the movable disc and the fixed disc are slightly turned from the neutral position.

When the two discs 5, 6 are turned from the neutral position of FIGS. 11 and 12 within a range of a smaller angle than an angle α 1, the projection 54 is brought into contact, as indicated by hatching of FIG. 14, with an end portion of the outer periphery side of the side surface 65a of the inner recess 65 and an end portion of the inner side of the side surface 66a of the outer recess 66. It should be noted, however, that when the transmission section A and the reception section B are turned from the neutral position by an angle α, the center line L2 and the line L5 are aligned with each other when viewed in plan view. As a result, the central area of the projection 54 is brought into line contact with the side surface 65a (opposing surface 6a) on the line L5.

When the angle formed between the transmission section A and the reception section B is brought to be larger than β, a state symmetric with the state of FIG. 14 is realized.

In the hinge assembly 1 thus constructed, when the movable disc 5 is turned from the neutral position, an intermediate portion of the projection 54 in the radial direction of the movable disc 5 is brought into contact at an end portion Q on the outer periphery side with the side surface 65a of the inner recess 65 as indicated by hatching of FIG. 14. Moreover, the intermediate area of the projection 54 is contacted with the side surface 66a of the outer recess 66 also at its inner end portion R. Accordingly, the contact area between the projection 54 and the recess 64 is increased twice compared with the contact area in the conventional hinge assembly in which the recess 64 is formed in square or sector-like configuration. Hence, the projection 54 and the recess 64 can be prevented from getting worn off soon.

In the hinge assembly 1, since the projection 54 and the inner recess 65 of the recess 64 are contacted with each other at two areas away in the circumferential direction of the discs 5, 6 when the transmission section A and the reception section B are turned into the talk position and the movable disc 5 and the fixed disc 6 are brought into the neutral position, the movable disc 5 and the fixed disc 6 can be positionally fixed with a decent degree of modesty. Accordingly, the transmission section A and the reception section B can be positionally fixed with a decent degree of modesty.

Figure 15:
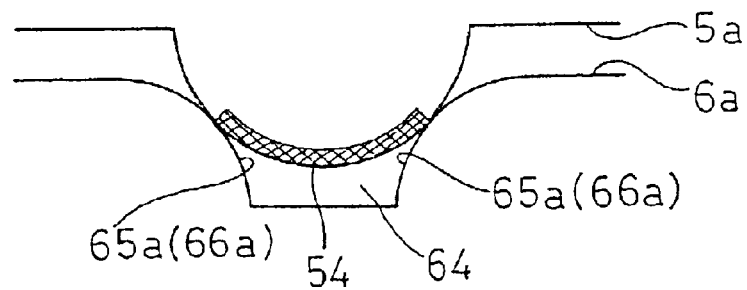
FIG. 15 is a view showing a contact range of a projection with respect to a recess according to the present invention.
Figure 16:
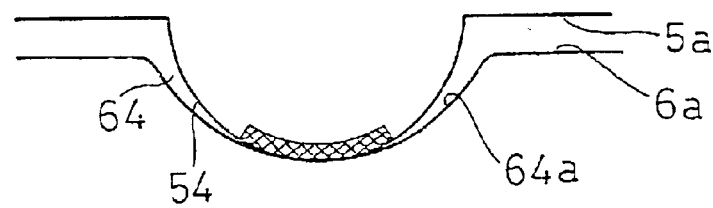
FIG. 16 is a view showing a contact range of a projection with respect to a recess according to the prior art.

As apparent from FIGS. 15 and 16, in the case where the side surfaces 65a, 66a of the recess 64 comprises the outwardly projected arcuate surface as in this hinge assembly 1, the length of the contact area (area indicated by double hatching of FIG. 15) of the projection 54 with respect to the side surfaces 65a, 66a of the projection 54 when the movable disc 5 and the fixed disc 6 are turned, is larger than the length of the contact area (area indicated by double hatching of FIG. 15) in the case where the bottom surface 64a, which defines the recess 64, comprises a concavely curved surface. By this, the projection 54 can more effectively be prevented from getting off soon.

It should be noted that the present invention should never be limited to the above-mentioned mode for carrying out the present invention. Instead, many changes and modifications can be made in accordance with necessity.

Figure 17:
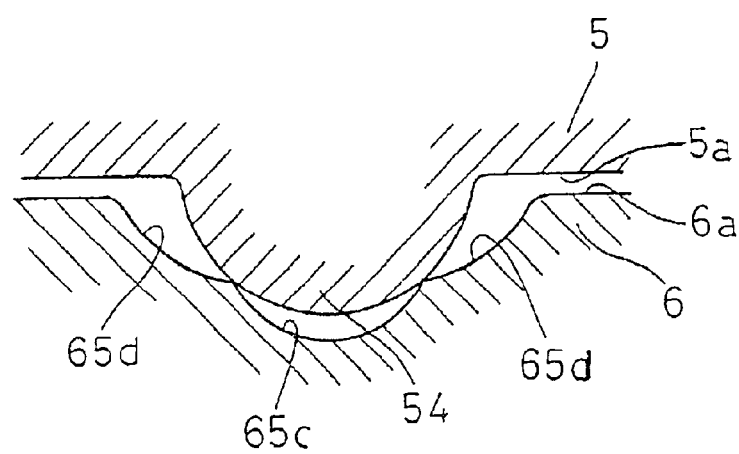
FIG. 17 is a sectional view, like FIG. 12, showing another mode for carrying out the present invention.
Figure 18:
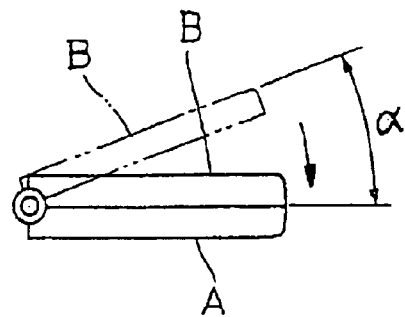
FIG. 18 is a view showing one example of a cellular telephone having a hinge assembly according to the present invention, in which the transmission section and the reception section are turned into the non-talk position.
Figure 19:
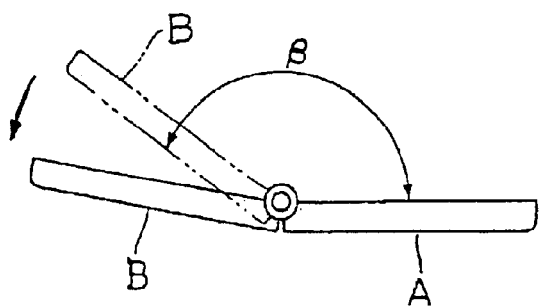
FIG. 19 is a view showing one example of the above cellular telephone, in which the transmission section and the reception section are turned into the talk position.
Figure 20:
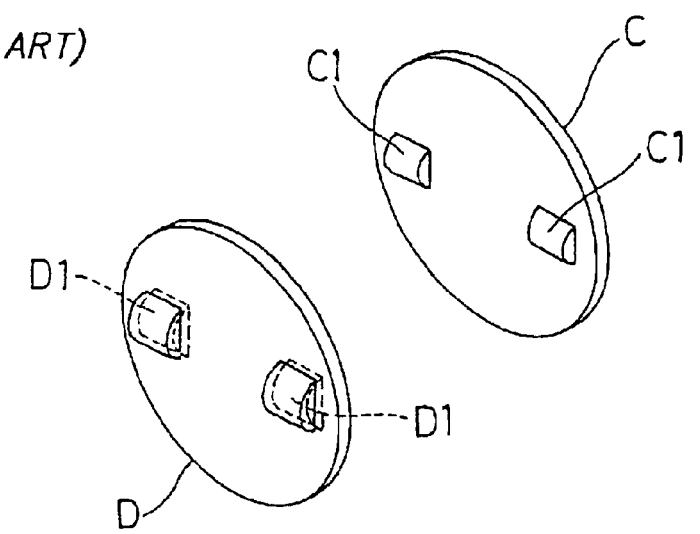
FIG. 20 is a perspective view showing a pair of abutment plates of the conventional hinge assembly.
Figure 21:
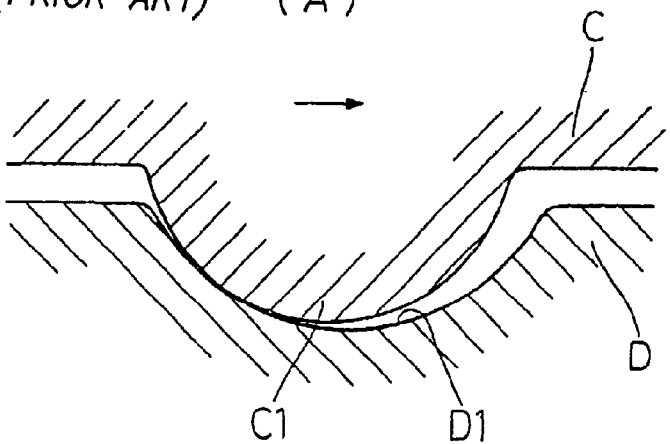
FIG. 21 is an enlarged sectional view showing a relation between the projection and recess formed on the pair of abutment plates shown in FIG. 20.
Figure 21:
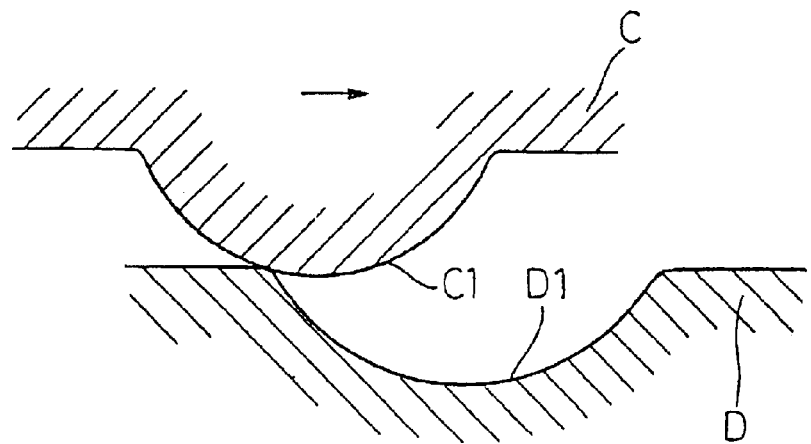
Figure 21:
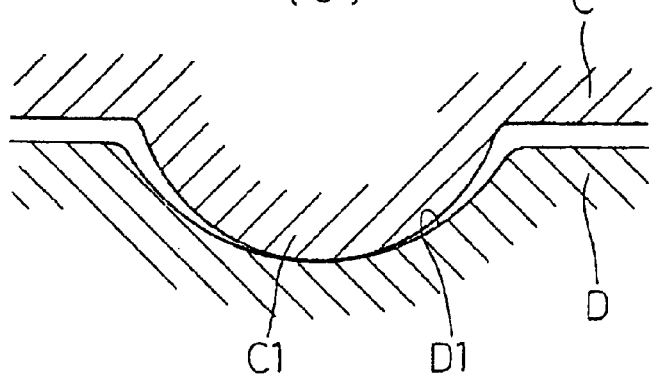
Figure 22:
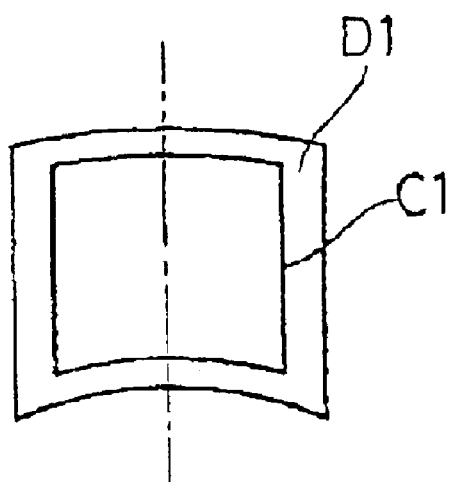
FIG. 22 shows a plan view showing one example of a projection and a recess in the conventional hinge assembly.
Figure 23:
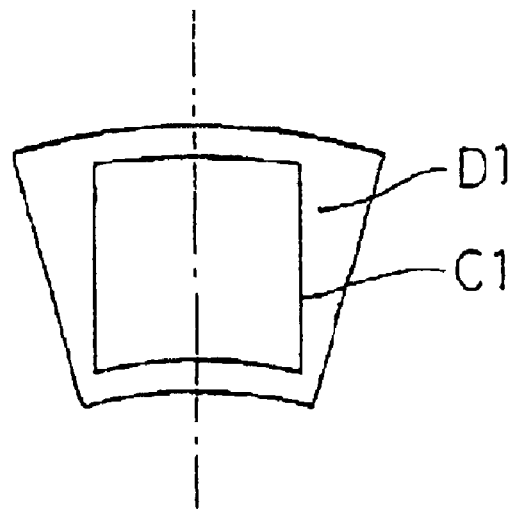
FIG. 23 shows a plan view showing another example of a projection and a recess in the conventional hinge assembly.

For example, as shown in FIG. 17, it is also accepted that the surface, which defines the inner recess 65, comprises the concavely curved surface 65c at the width-wise central area and concavely curved surface 65d on the opposite sides. In this case, the concavely curved surface 65c comprises an arcuate surface having a smaller radius of curvature than the arcuate surface which defines the projection 54, so that the projection 54 can contact the inner recess 65 at two areas which are away from each other in the circumferential direction when the movable disc 5 and the fixed disc 6 are turned into the neutral position. The concavely curved surface 65d comprises an arcuate surface having a larger radius of curvature than the arcuate surface which defines the projection 54. The above-mentioned structural feature in which the inner recess 65 comprises a concavely curved surface 65c on the center side and two concavely curved surfaces 65d on opposite sides is likewise applied to the outer recess 66.

Moreover, in the above-mentioned mode for carrying out the present invention, one pair of projections 54 and one pair of recesses 64 are arranged in such a manner as to be 180 degrees away from each other in the circumferential direction. It is also accepted, as in Japanese Patent Application Unexamined Publication No. H10-317779 (especially FIG. 12), that a pair of projections 54 are arranged at an angle less than 180 degrees, for example, about 160 degrees, and three recesses 64 are formed and arranged in a pattern of "Y".

INDUSTRIAL APPLICABILITY

A hinge assembly according to the present invention can be used as a hinge assembly for turnably connecting two goods, such as, a main body and a cover of a cellular telephone or the like.

What is claimed is:

1. A hinge assembly comprising a pair of abutment members arranged in mutually opposing relation and capable of making relative rotation, and bias means for biasing said pair of abutment members, so as to be press contacted with each other, one of said pair of abutment members having a projection formed on an opposing surface thereof and extending radially of said abutment member, the other abutment member having a recess formed on an opposing surface thereof and allowing said projection to be brought therein and out in accordance with the relative rotation of their said abutment members, said hinge assembly being characterized in that said recess comprises an inner recess at an inner side and an outer recess at an outer side in a radial direction of said abutment member, and one side surface of said inner press is parallel to a radial line of said abutment member and one side surface of said outer recess is slanted with respect to one side surface of said inner recess such that an inner end portion thereof is crossed with an outer end portion of one side surface of said inner recess and an outer end portion thereof is away from said inner recess in a circumferential direction towards an outside in the radial direction of said abutment member, so that the one side surfaces of said inner and outer recesses which contact one end portion of said projection, when viewed in a direction of axes of said abutment members, exhibit a substantially dogleg like configuration as a whole.

2. A hinge assembly according to claim 1, wherein one side surface of said outer recess is arranged such that one end portion of the one side surface of said outer recess in the circumferential direction of said abutment member contacts an opposing surface of said abutment member.

3. A hinge assembly according to claim 1, wherein one side surfaces of said inner recess and said outer recess are defined by an outwardly projecting arcuate surface.

4. A hinge assembly according to claim 1, wherein said inner recess and said outer recess, when viewed in an axial line of said abutment member, are in symmetric relation with respect to a center line passing through width-wise centers of said inner recess and said outer recess and orthogonal to the axis of said abutment member.

5. A hinge assembly according to claim 3, wherein said inner recess and said outer recess, when viewed in an axial line of said abutment member, are in symmetric relation with respect to a center line passing through width-wise centers of said inner recess and said outer recess and orthogonal to the axis of said abutment member.

6. A hinge assembly according to claim 1, wherein when said pair of abutment members is turned into a predetermined neutral position, said projection comes into contact with opposite side portions of said inner recess.

7. A hinge assembly according to claim 3, wherein when said pair of abutment members is turned into a predetermined neutral position, said projection comes into contact with opposite side portions, of said inner recess.

8. A hinge assembly according to claim 4, wherein, when said pair of abutment members is turned into a predetermined neutral position, said projection comes into contact with opposite side portions of said inner recess.

9. A hinge assembly according to claim 5, wherein when said pair of abutment members is turned into a predetermined neutral position, said projection comes into contact with opposite side portions of said inner recess.

10. A hinge assembly according to claim 2, wherein one side surfaces of said inner recess and said outer recess are defined by an outwardly projecting arcuate surface.

11. A hinge assembly according to claim 2, wherein said inner recess and said outer recess, when viewed in an axial line of said abutment member, are in symmetric relation with respect to a center line passing through width-wise centers of said inner recess and said outer recess and orthogonal to the axis of said abutment member.

12. A hinge assembly according to claim 2, wherein when said pair of abutment members is turned into a predetermined neutral position, said projection comes into contact with opposite side portions of said inner recess.

13. A hinge assembly according to claim 10, wherein said inner recess and said outer recess, when viewed in an axial line of said abutment member, are in symmetric relation with respect to a center line passing through width-wise centers of said inner recess and said outer recess and orthogonal to the axis of said abutment member.

14. A hinge assembly according to claim 10, wherein when said pair of abutment members is turned into a predetermined neutral position, said projection comes into contact with opposite side portions of said inner recess.

15. A hinge assembly according to claim 11, wherein when said pair of abutment members is turned into a predetermined neutral position, said projection comes into contact with opposite side portions of said inner recess.

16. A hinge assembly according to claim 13, wherein when said pair of abutment members is turned into a predetermined neutral position, said projection comes into contact with opposite side portions of said inner recess.

* * * * *

UNITED STATES PATENT AND TRADEMARK OFFICE
CERTIFICATE OF CORRECTION

PATENT NO. : 6,772,481 B2
DATED : August 10, 2004
INVENTOR(S) : Oshima et al.

It is certified that error appears in the above-identified patent and that said Letters Patent is hereby corrected as shown below:

Column 9,
Line 11, "said insert press" should be -- said inner recess --; and
Line 23, "substantially dogleg like configuration" should be -- substantially dogleg configuration --.

Column 10,
Line 6, "opposite side portions, of said inner recess" should be -- opposite side portions of said inner recess --.

Signed and Sealed this

Twelfth Day of July, 2005

JON W. DUDAS
*Director of the United States Patent and Trademark Office*